United States Patent [19]

Nishiyama et al.

[11] Patent Number: 5,038,737
[45] Date of Patent: Aug. 13, 1991

[54] CONTROL APPARATUS FOR AN INTERNAL COMBUSTION ENGINE

[75] Inventors: Ryoji Nishiyama; Satoru Ohkubo, both of Amagasaki; Akira Demizu, Himeji, all of Japan

[73] Assignee: Mitsubishi Denki Kabushiki Kaisha, Tokyo, Japan

[21] Appl. No.: 592,094

[22] Filed: Oct. 3, 1990

[30] Foreign Application Priority Data

Nov. 21, 1989 [JP] Japan .................................. 1-304257

[51] Int. Cl.⁵ .......................... F02D 41/04; F02P 5/10
[52] U.S. Cl. .................................... 123/435; 123/425
[58] Field of Search ............... 123/425, 435, 440, 478, 123/489

[56] References Cited

U.S. PATENT DOCUMENTS

| | | | |
|---|---|---|---|
| 4,561,401 | 12/1985 | Hata et al. ...................... | 123/435 X |
| 4,598,680 | 7/1986 | Lanfer ............................ | 123/435 X |
| 4,622,939 | 11/1986 | Matekunas ......................... | 123/425 |
| 4,788,854 | 12/1988 | Javaherian ........................ | 73/117.3 |
| 4,825,833 | 5/1989 | Ikeura et al. ..................... | 123/435 |
| 4,840,159 | 6/1989 | Matsumoto ......................... | 123/585 |
| 4,903,665 | 2/1990 | Washino et al. ................... | 123/435 |
| 4,913,118 | 4/1990 | Watanabe .......................... | 123/435 |
| 4,928,653 | 5/1990 | Ohkubo et al. .................... | 123/435 |
| 4,962,739 | 10/1990 | Wataya ............................ | 123/435 |
| 4,984,546 | 1/1991 | Shimomura et al. ............. | 123/435 X |

Primary Examiner—Willis R. Wolfe
Attorney, Agent, or Firm—Sughrue, Mion, Zinn, Macpeak and Seas

[57] ABSTRACT

A control apparatus for an internal combustion engine calculates a basic fuel injection amount or a basic ignition timing for an engine based on the air intake quantity into the cylinders of the engine. The air intake quantity is calculated based on the pressure within a cylinder of the engine at a prescribed crankshaft angle. The fuel injection amount or the ignition timing is then controlled by feedback control so that a prescribed controlled variable, which is a function of the cylinder internal pressure, attains a target value.

7 Claims, 6 Drawing Sheets

CONTROL APPARATUS FOR AN INTERNAL COMBUSTION ENGINE

BACKGROUND OF THE INVENTION

This invention relates to a control apparatus for controlling one or both of the fuel injection and the ignition timing of an internal combustion engine. More particularly, it relates to a control apparatus for an internal combustion engine which does not employ an air intake pressure sensor or an air intake rate sensor.

Conventional control apparatuses for internal combustion engines sense various parameters of engine operation, such as coolant temperature, air intake pressure, the engine rotational speed, and the oxygen concentration in the exhaust gas. The ignition timing and the fuel injection amount are then calculated based on a predetermined mathematical relationship among the sensed parameters. The relationship, which is usually stored in the form of a table in a read-only memory, gives the optimal fuel injection amount and ignition timing for a baseline engine. However, due to manufacturing discrepancies among mass-produced engines, the operating characteristics of the engine which is actually being controlled may differ significantly from those of the baseline engine. Furthermore, even if the engine being controlled initially has the same characteristics as a baseline engine at the time of manufacture, due to wear of the engine parts with the passage of time, the operating characteristics can change so as to differ from those of the baseline engine. Therefore, the relationship which is stored in the memory may not give the proper ignition timing and fuel injection amount for the engine being controlled, so proper control of the engine can not be carried out, resulting in a decrease in engine performance.

SUMMARY OF THE INVENTION

Accordingly, it is an object of the present invention to provide a control apparatus for an internal combustion engine which can accurately control the fuel injection amount and ignition timing of an engine, even if the operating characteristics of the engine are not identical to a baseline engine.

It is another object of the present invention to provide a control apparatus for an internal combustion engine of the type which is not equipped with an air intake pressure sensor or an air intake rate sensor.

It is still another object of the present invention to provide a method for controlling an internal combustion engine.

A control apparatus according to the present invention calculates a fuel injection amount or a ignition timing for an engine based on the air intake quantity into the cylinders of the engine. The air intake quantity is calculated based on the pressure within a cylinder of the engine at a prescribed crankshaft angle. The fuel injection amount or the ignition timing is then corrected by feedback control so as to decrease the difference between a prescribed controlled variable, which is a function of the cylinder internal pressure, and a target value.

The controlled variable is not restricted to any particular variable, and more than one controlled variable can be employed. For example, a first controlled variable can be controlled by adjusting the fuel injection amount, and a second controlled variable can be controlled by adjusting the ignition timing.

In a control method according to the present invention, the air intake quantity in a cylinder of an engine is calculated based on the pressure within the cylinder. A fuel injection amount and/or an ignition timing for the engine is calculated based on the air intake quantity, and a controlled variable is calculated based on the pressure in a cylinder of the engine. The fuel injection amount and/or the ignition timing are then corrected by feedback control so as to decrease the difference between the controlled variable and a target value.

BRIEF DESCRIPTION OF THE DRAWINGS

FIGS. 3a–g are timing diagrams for the operation of the embodiment of FIG. 1.

DESCRIPTION OF THE PREFERRED EMBODIMENTS

Figure 1:
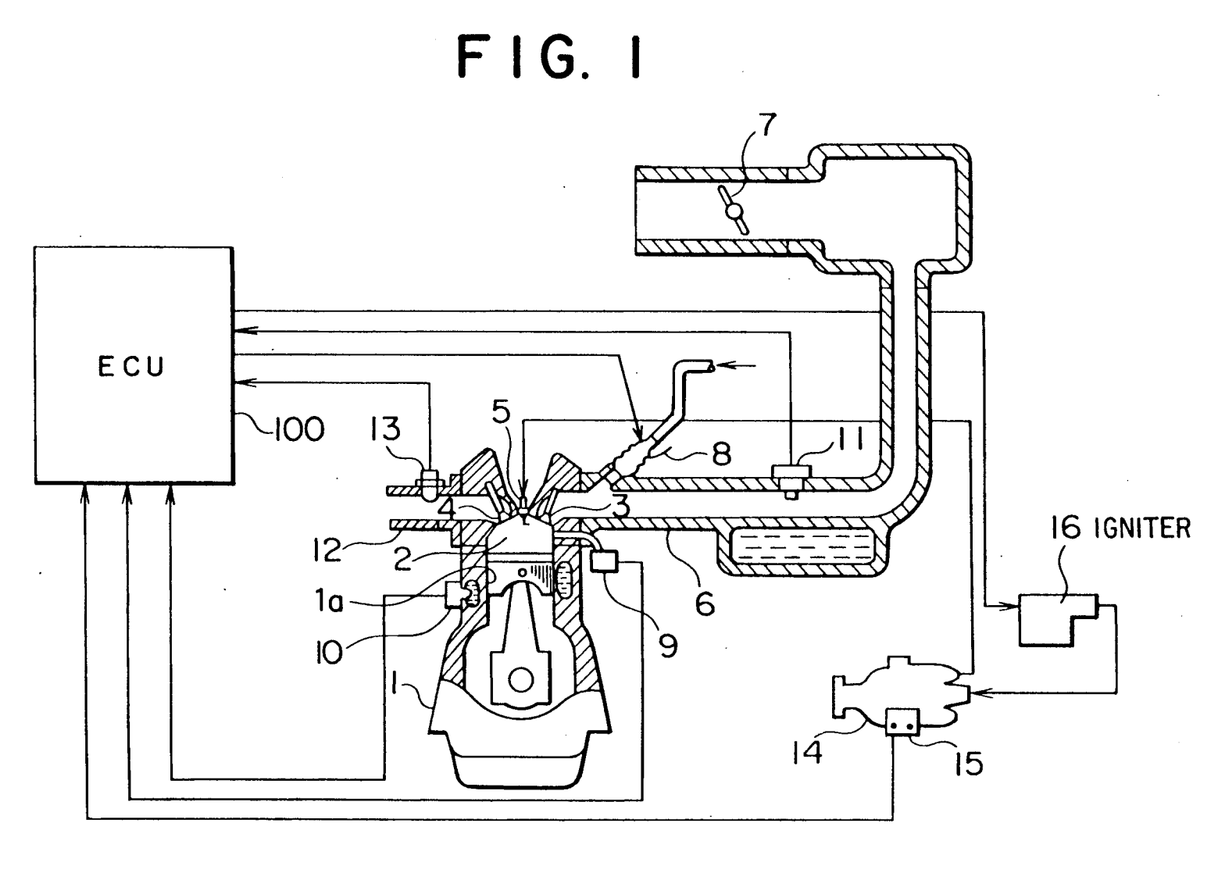
FIG. 1 is a schematic cross-sectional view of an engine equipped with an embodiment of a control apparatus according to the present invention.

FIG. 1 schematically illustrates an internal combustion engine equipped with an embodiment of a control apparatus according to the present invention. As shown in this figure, an engine 1 is equipped with a plurality of cylinders 1a, only one of which is shown. Each cylinder 1a houses a reciprocating piston 2 and is equipped with an intake valve 3, an exhaust valve 4, and a spark plug 5. An intake manifold 6 is connected to the cylinders 1a and is equipped with a throttle valve 7 for controlling the flow rate of air into the engine 1. A fuel injector 8 is installed in the intake manifold 6 in the vicinity of each of the intake valves 3. An exhaust manifold 12 is connected to the exhaust valves 4 of the cylinders 1a.

Each cylinder 1a is equipped with a pressure sensor 9, such as a piezo-electric element, which generates an electrical signal, such as a voltage, corresponding to the absolute pressure within the cylinder 1a. The output signal of the pressure sensor 9 is provided to an electronic control unit (ECU) 100. The temperature of the cooling water for the engine is sensed by a water temperature sensor 10, which provides a corresponding electrical output signal to the ECU 100. An intake air temperature sensor 11 is installed in the intake manifold 6 and provides the ECU 100 with an electrical output signal corresponding to the intake air temperature. An air-fuel ratio sensor (A/F sensor) 13 is mounted in the exhaust manifold 12. It provides the ECU 100 with an electrical output signal corresponding to the oxygen concentration in the exhaust gas from the cylinders 1a.

Figure 3:
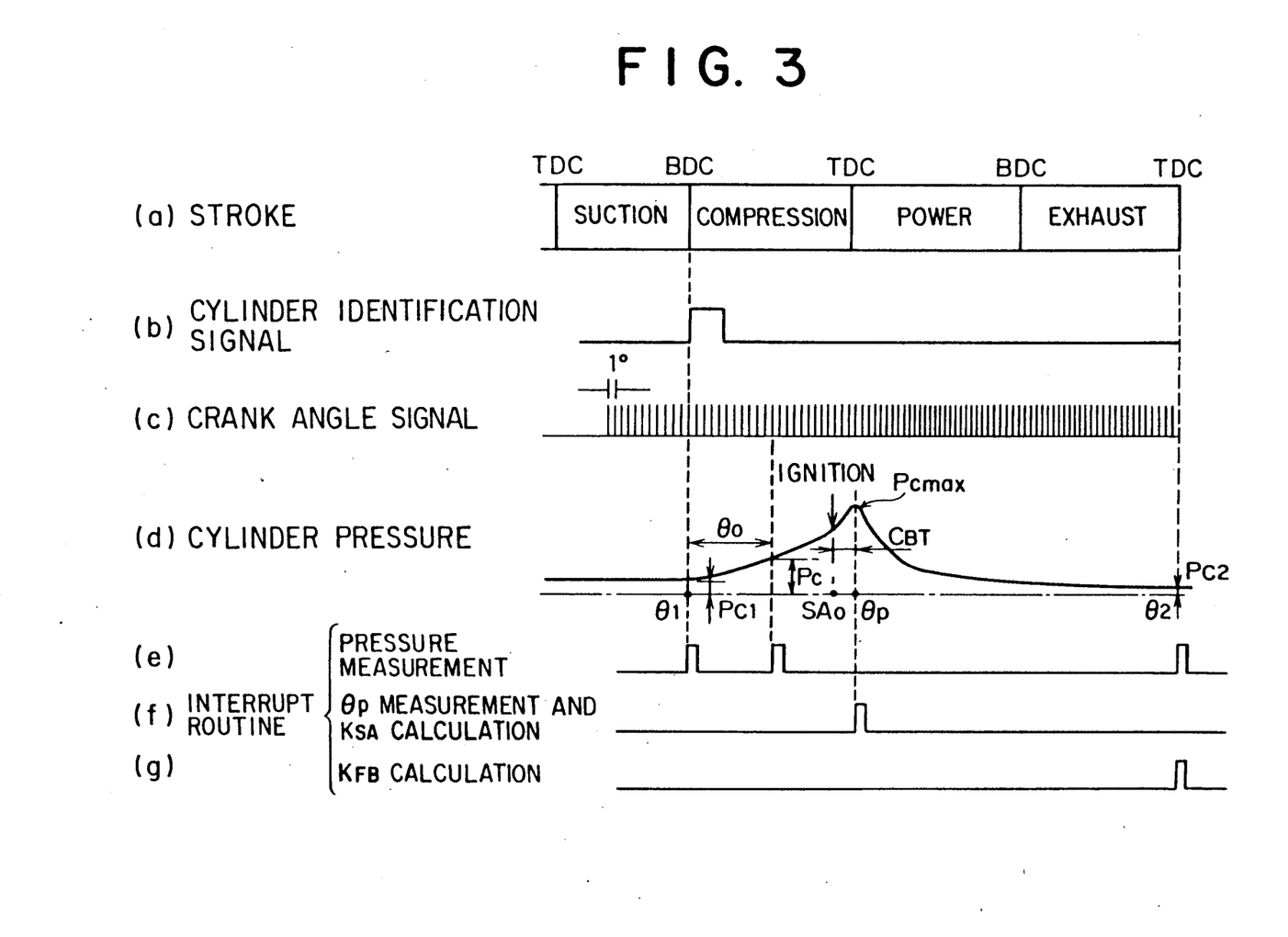

The spark plugs 5 receive an ignition voltage from an igniter 16 via a distributor 14. The distributor 14 is equipped with a signal generator 15 which generates electrical output signals at prescribed crankshaft angles of the engine 1 and provides these signals to the ECU 100. Signal generators for use in engine control systems are well known in the art and any type may be employed. For example, the signal generator 15 may comprises an optical rotation sensor including a rotating disk mounted on the shaft of the distributor 14 and having a plurality of slits formed therein, and a pair of photointerrupters for sensing the rotation of the disk. Each of the photointerrupters includes a light emitting element disposed on one side of the disk and a light sensitive element disposed on the opposite side of the disk. As the disk rotates, the slits in the disk intermittently permit the passage of light between the light emitting elements and the light sensitive elements, and the light sensitive elements generate electrical output signals having a frequency corresponding to the rotational speed of the disk. The electrical output signal from one of the photointerrupters is used as a crank angle signal. Typically, the crank angle signal has a pulse for every 1 degree of crankshaft rotation, although the number of degrees of rotation per pulse is not critical. The electrical output signal from the other photointerrupter is used as a cylinder identification signal. This signal has a pulse each time the piston of a prescribed cylinder is at a prescribed angular position. For example, in the present embodiment, the cylinder identification signal has a pulse each time the piston of one of the cylinders is at bottom dead center (BDC) during its compression stroke. FIGS. 3b and 3c illustrates the waveforms of the cylinder identification signal and the crank angle signal, respectively, of this embodiment. However, the frequencies and waveforms of the output signals from the signal generator 15 are not critical and can differ from those shown in FIG. 3.

The ECU 100 includes a CPU, a ROM, and a RAM. Based on input signals from the pressure sensor 9, the water temperature sensor 10, the air temperature sensor 11, the A/F sensor 13, and the signal generator 15, the ECU 100 calculates the ignition timing and the fuel injection amount and controls the operation of the igniter 16 and the fuel injectors 8 so as to control the ignition timing and the fuel injection amount of the engine.

Figure 2:
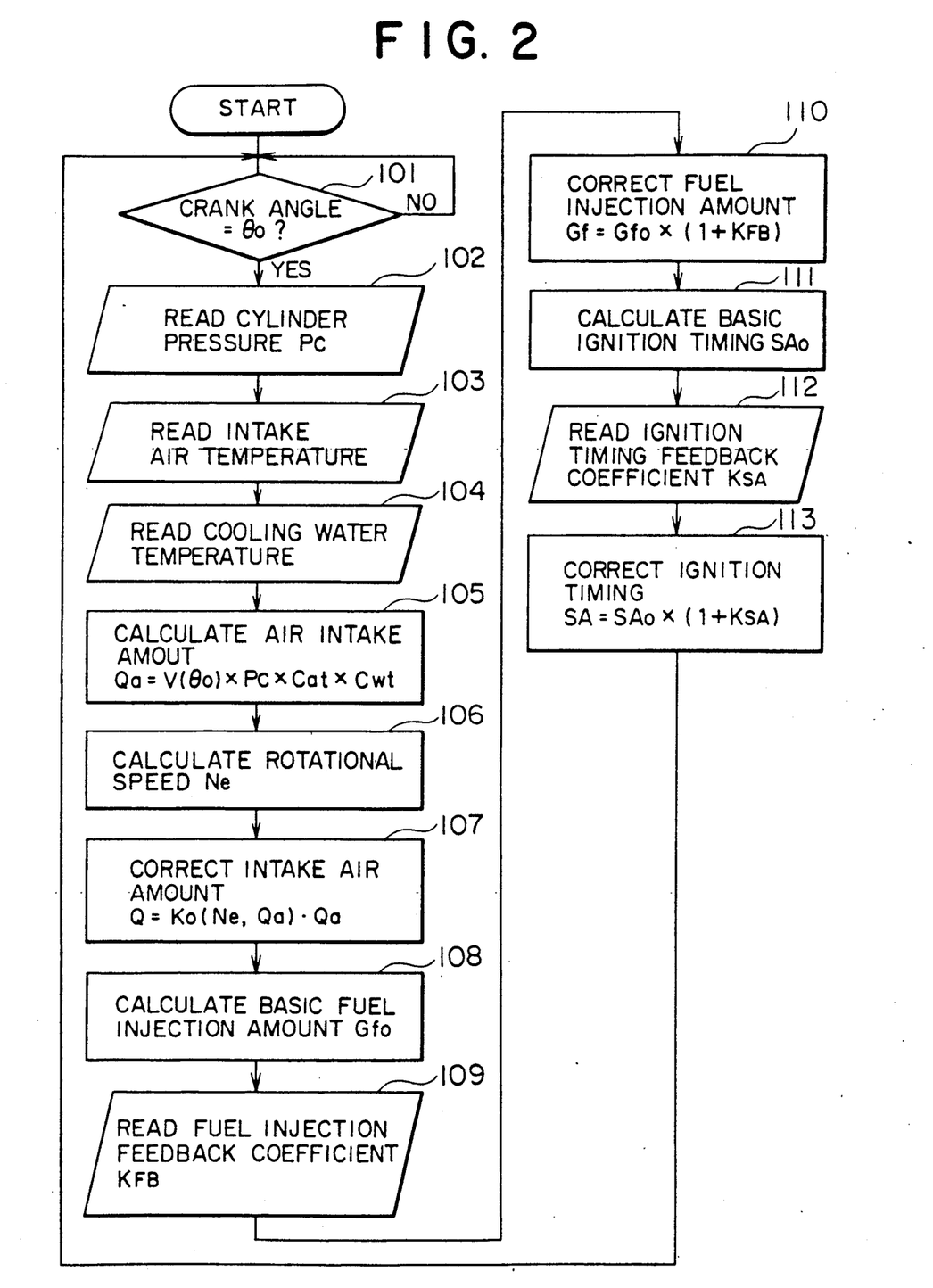
FIG. 2 is a flow chart of a program executed by the ECU of the embodiment of FIG. 1.
Figure 4:
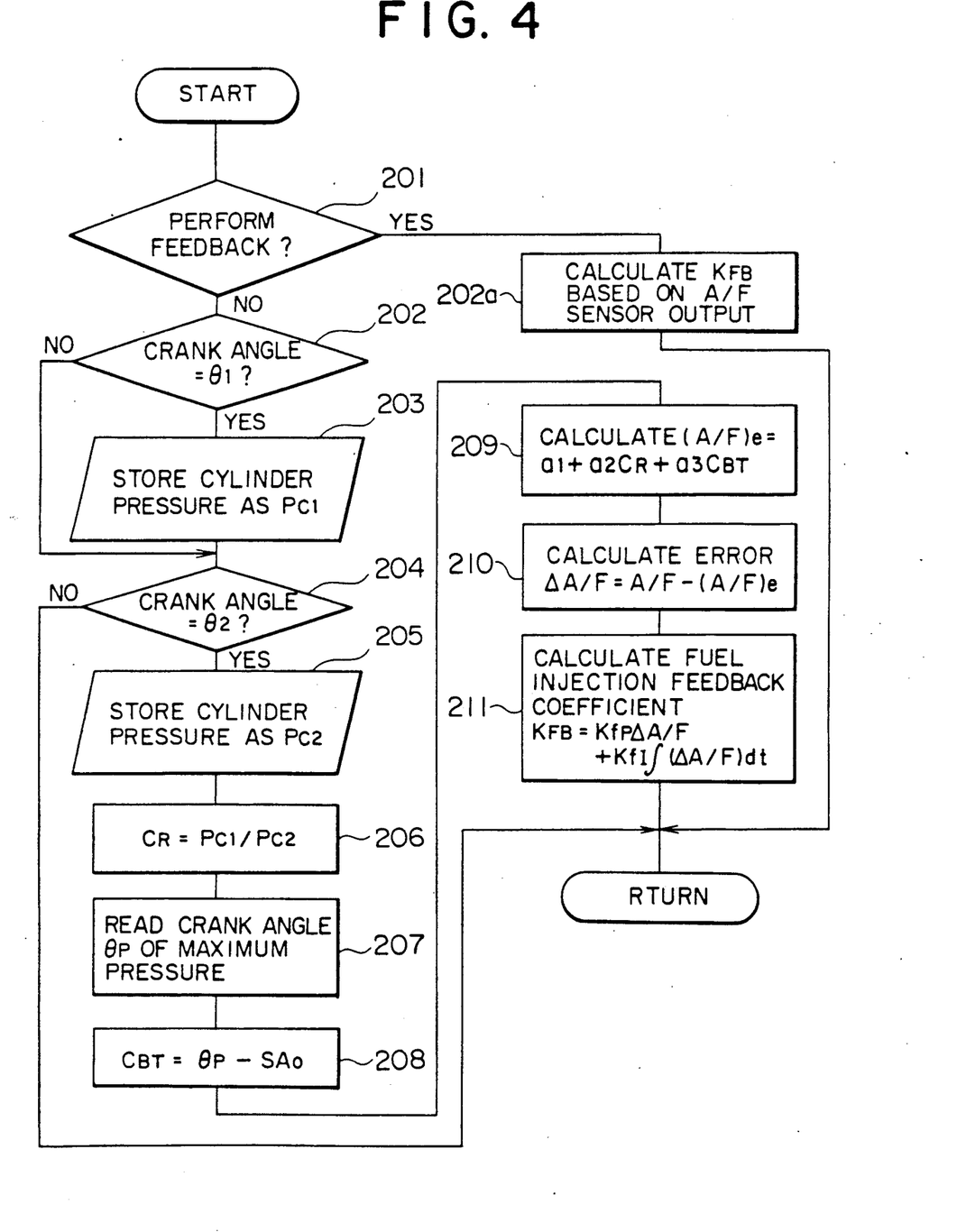
FIG. 4 is a flow chart of an interrupt routine performed by the ECU of FIG. 1 for calculating a feedback coefficient $K_{FB}$ for fuel injection.
Figure 5:
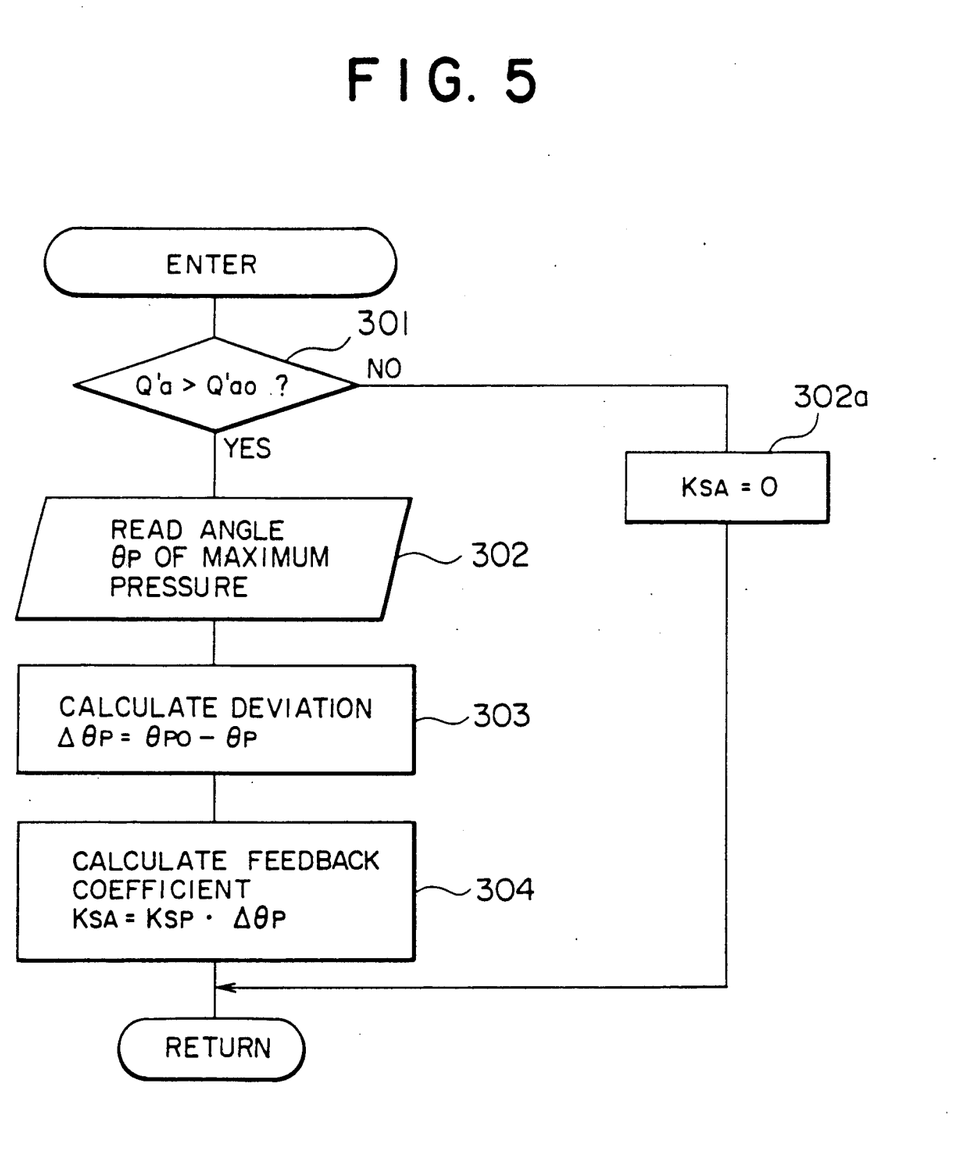
FIG. 5 is a flow chart of an interrupt routine performed by the ECU of FIG. 1 for calculating a feedback coefficient $K_{SB}$ for ignition timing.

FIG. 2 is a flow chart of an example of a main routine executed by the ECU 100 for calculating the fuel injection amount and the ignition timing, FIG. 4 is a flow chart of an interrupt routine executed by the ECU 100 for calculating a fuel injection feedback coefficient $K_{FB}$, and FIG. 5 is a flow chart of an interrupt routine executed by the ECU 100 for calculating an ignition timing feedback coefficient $K_{SA}$. The operation of the embodiment of FIG. 1 will be explained while referring to these flow charts and to FIG. 3, which is a timing diagram of the operation of this embodiment.

The ECU 100 receives the output signals from the signal generator 15. In Step 101, the ECU 100 determines whether a prescribed crankshaft angle $\theta_0$ has elapsed since a reference crankshaft angle $\theta_1$, corresponding to the BDC position of the piston 2 of the cylinder 1a now in its compression stroke. As shown in FIG. 3, in the present embodiment, the reference crankshaft angle $\theta_1$ corresponds to the rising edge of the cylinder identification signal from the signal generator 15. The ECU 100 determines the crankshaft angle by counting the number of pulses of the crank angle signal from the signal generator 15 since the most recent pulse of the cylinder identification signal. The ECU 100 repeats Step 101 until crankshaft angle $\theta_0$ has elapsed. When the ECU 100 determines that crankshaft angle $\theta_0$ has elapsed, in Step 102, the ECU 100 reads the output signal from the cylinder pressure sensor 9, which indicates the internal pressure in the cylinder 1a which is presently in its compression stroke. The cylinder pressure, $P_c$, is stored in the RAM or in a register of the CPU. In Step 103, the ECU 100 reads the output signal from the air temperature sensor 11, and in Step 104, it reads the output signal of the cooling water temperature sensor 10. In Step 105, the ECU 100 calculates the nominal quantity $Q_a$ of combustible air in the cylinder 1a now in its compression stroke by the formula $Q_a = V_\theta \times P_c \times C_{at} \times C_{wt}$, wherein $V_0$ is the volume of the cylinder 1a at crankshaft angle $\theta_0$, $P_c$ is the cylinder pressure, $C_{at}$ is a conversion coefficient which when multiplied by the pressure $P_c$ gives the density of the air within the cylinder 1a, and $C_{wt}$ is a correction coefficient which compensates for the increase in the temperature of the intake air between the time that it passes the air temperature sensor 11 and the time it enters the cylinder 1a. $C_{at}$ is a predetermined function of the intake air temperature measured by the air temperature sensor 11, and $C_{wt}$ is a predetermined function of the cooling water temperature measured by the water temperature sensor 10. The relationship between $C_{at}$ and intake air temperature and the relationship between $C_{wt}$ and cooling water temperature can be stored in the ROM of the ECU 100 in the form of look-up tables. The value of $V_{\theta 0}$ is a constant so can be stored in the ROM in advance.

The nominal air quantity $Q_a$ calculated in Step 105 is larger than the actual quantity of combustible air in the cylinder 1a, since $Q_a$ includes exhaust gas remaining in the cylinder 1a after the previous exhaust stroke. Therefore, it is necessary to correct the nominal air quantity $Q_a$ for this exhaust gas. In Step 106, the ECU 100 calculates the engine rotational speed $N_e$, and in Step 107, the actual air quantity $Q_a'$ (nominal air quantity − remaining exhaust gas) is calculated using the formula $Q_a' = K_0(N_e, Q_a) \times Q_a$. The rotational speed $N_e$ can be calculated based on the length of the time between pulses from the signal generator 15. $K_0$ is a charging correction coefficient which is a predetermined function of the rotational speed $N_e$ and the nominal air quantity $Q_a$. This function can be stored in the ROM in the form of a look-up table.

In Step 108, based on the actual air quantity $Q_a'$, the ECU 100 calculates a basic fuel injection amount $Gf_0$ to achieve a target air-fuel ratio $K(A/F)$ and stores the result in the RAM. The relationship between the basic fuel injection amount $Gf_0$, the target air-fuel ratio $K(A/F)$, and the actual air quantity $Q_a'$ can be determined in advance and stored in the ROM in the form of a look-up table. In Step 109, the value of a feedback coefficient $K_{FB}$ for fuel injection, which is previously calculated in the interrupt routine illustrated in FIG. 4, is read from the RAM. In Step 110, the basic fuel injection amount $Gf_0$ is corrected to obtain an actual fuel injection amount Gf by the formula $Gf = Gf_0 \times (1 + K_{FB})$, and the drive pulse width $\tau$ of the fuel injector 5 is calculated based on the flow rate gain $K_1$ of the fuel injector 5 by the formula $\tau = K_1 \times Gf$. The value of $\tau$ is then set in a special fuel injection register of the CPU or in the RAM and is used to control the fuel injector 5 for the next cylinder 1a to receive fuel, or for the cylinder 1a now in its compression stroke the next time fuel injection for that cylinder is performed.

In Step 111, the ECU 100 determines a basic ignition timing $SA_0$ based on the engine rotational speed $N_e$ and the actual air quantity $Q_a'$ in the cylinder 1a presently in its compression stroke. The relationship between $SA_0$, the engine rotational speed $N_e$, and the actual air quantity $Q_a'$ can be stored in advance in a table in the ROM.

In Step 112, a feedback coefficient $K_{SA}$ for ignition timing, which is previously determined in the interrupt routine illustrated in FIG. 5, is read from the RAM. In Step 113, the basic ignition timing SA is corrected to obtain the actual ignition timing SA by the formula $SA = SA_0 \times (1 + K_{SA})$. The actual ignition timing SA is then set in a special ignition timing register of the CPU or in the RAM. Based on the calculated ignition timing SA, the igniter 16 is controlled by the ECU 100 in a conventional manner so as to carry out ignition.

Figure 6:
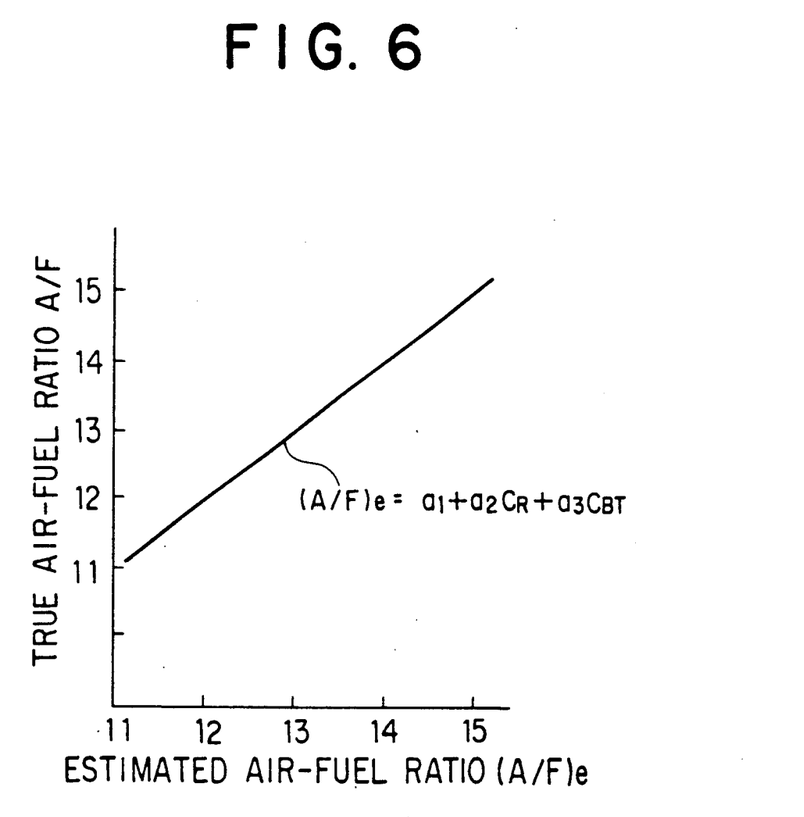
FIG. 6 is a graph of the relationship between the true air-fuel ratio in an engine and an estimated air-fuel ratio.

FIG. 4 illustrates an interrupt routine for calculating the feedback coefficient $K_{FB}$ for fuel injection which is initiated at the crank angle of $\theta_P$ in FIG. 3. In Step 201, the actual air quantity $Q_a'$ calculated in Step 107 of FIG. 2, is read from the RAM and compared with a reference value to determine if the engine load is within a predetermined range suitable for performing feedback control of the air-fuel ratio. If the engine load is in the predetermined range, then in Step 202a, the feedback coefficient $K_{FB}$ is calculated based on the output of the conventional air/fuel ratio sensor 13 in a conventional manner, and a return is performed. If the engine load is not in the predetermined range for performing feedback control, then in Step 202, based on the crank angle signal from the signal generator 15, the ECU 100 determines whether the present crankshaft angle is a first prescribed crankshaft angle $\theta_1$ occurring during the suction stroke of the cylinder 1a. In the example of FIG. 3, $\theta_1$ occurs at the bottom dead center position of the piston 2 at the end of its suction stroke. If the crankshaft angle equals $\theta_1$, then the cylinder pressure is read in from the cylinder pressure sensor 9 and stored in the RAM or in a register of the CPU as $P_{c1}$. If the crankshaft angle is not equal to $\theta_1$, then the routine jumps to Step 204. In Step 204, it is determined whether the present crankshaft angle equals a second prescribed crankshaft angle $\theta_2$ occurring during the exhaust stroke of the cylinder 1a. In the example of FIG. 3, $\theta_2$ occurs at top dead center at the end of the exhaust stroke. If the crankshaft angle does not equal $\theta_2$, then a return is performed, while if it does equal $\theta_2$, in Step 205, the ECU 100 reads the cylinder pressure from the cylinder pressure sensor 9 and stores it in the RAM or in a register of the CPU as $P_{C2}$. In Step 206, the ECU 100 calculates the ratio $C_R = P_{C1}/P_{C2}$, and in Step 207, a previously-determined crankshaft angle $\theta_P$ at which the maximum cylinder pressure occurs is read from the RAM. The value of $\theta_P$ is previously determined and stored in the RAM by an unillustrated interrupt routine using a peak hold circuit in the ECU 100 into which the output of the pressure sensor 9 is input. In Step 208, the difference $C_{BT}$ between $\theta_P$ and the basic ignition timing $SA_O$, which was determined in Step 111 of FIG. 2, is calculated. $C_{BT}$ is a parameter which is very sensitive to changes in the air-fuel ratio and expresses changes in the combustion speed within a cylinder 1a with respect to the air-fuel ratio. In Step 209, an estimated air-fuel ratio $(A/F)_e$ is calculated by the formula $(A/F)_e = a_1 + a_2 C_R + a_3 C_{BT}$, wherein $a_1$-$a_3$ are constants which are experimentally determined in advance. FIG. 6 is a graph of the relationship between the actual air-fuel ratio and the estimated air-fuel ratio $(A/F)_e$ given by the above formula. It can be seen that this formula gives a very accurate estimate of the air-fuel ratio. In Step 210, the difference A/F between a target air-fuel ratio A/F and the estimated air-fuel ratio $(A/F)_e$ is calculated. In Step 211, the fuel injection feedback coefficient $K_{FB}$ is calculated by the formula $K_{FB} = K_{fP} A/F + K_{fI} \int A/F \, dt$, wherein $K_{fP}$ is a proportional feedback gain and $K_{fI}$ is an integral feedback gain. The feedback coefficient $K_{FB}$ is then stored in the RAM and a return is performed.

FIG. 5 illustrates an interrupt routine for calculating the feedback coefficient $K_{SA}$ for ignition timing which is initiated at the crank angle of $\theta_2$ in FIG. 3. Feedback control of the ignition timing is performed only when the engine load is above a prescribed level in order to increase the precision of ignition timing control in a load region in which it is easy for knocking to occur. Therefore, in Step 301, the actual air quantity $Q_a'$ calculated in Step 107 of the routine of FIG. 2 is compared with a reference value $Q_{ao}'$. If $Q_a' \leq Q_{ao}'$, then feedback control is not performed, so in Step 302a, the feedback coefficient $k_{SA}$ is set equal to 0, and a return is performed. However, if $Q_a' > Q_{ao}'$, then in Step 302, the crankshaft angle $p$ at which the maximum cylinder pressure occurs is read from the RAM, and in Step 303, the difference $\Delta\theta_P$ between a predetermined target value $\theta_{PO}$ for the crankshaft angle of maximum cylinder pressure and the actual crankshaft angle $\theta_P$ of maximum cylinder pressure is calculated. In Step 304, $\Delta\theta_P$ is multiplied by a predetermined gain $K_{SP}$ to obtain the ignition timing feedback coefficient $K_{SA}$, which is stored in the RAM, and a return is performed.

In the main routine of FIG. 2, in Step 105, the density of the air in the cylinder 1a is calculated based on the temperature measured by the intake air temperature sensor 11. Instead of measuring the temperature in the intake manifold 6, it is theoretically possible to directly measure the average air temperature of the fuel-air mixture within a cylinder 1a using a temperature sensor within the cylinder 1a. However, in actual practice, it is difficult to mount a temperature sensor within a cylinder 1a because of the extreme heat to which the sensor is subjected during ignition, so it is generally preferable to measure the intake air temperature in the intake manifold 6, as in the illustrated embodiment.

The above-described embodiment uses the estimated air-fuel ratio $(A/F)_e$ and the crankshaft angle $\theta_P$ corresponding to maximum cylinder pressure as controlled variables and adjusts the fuel injection and the ignition timing, respectively, to reduce the difference between the controlled variables and target values. However, it is possible to perform feedback control using other engine parameters as controlled variables. For example, the average effective pressure within a cylinder, which is an indication of the engine torque, can be used as a controlled variable. Using the top dead center position during the suction stroke of a cylinder as a reference, if the cylinder pressure is measured at prescribed intervals, such as every 4 degrees of crankshaft rotation, the average effective pressure $P_i$ can be calculated by the following formula:

$$P_i = \left\{ \sum_{i=1}^{45} P_c(\theta_i) - \sum_{i=46}^{90} P_c(\theta_i) + \sum_{i=91}^{135} P_c(\theta_i) - \sum_{i=136}^{180} P_c(\theta_i) \right\} / 45$$

One or both of the fuel injection amount and the ignition timing can then be controlled so that the difference Pi between the measured average effective pressure $P_i$ and a target value $P_{io}$ becomes zero.

In the embodiment of FIG. 1, each cylinder 1a of the engine 1 is equipped with its own pressure sensor 9. However, it is possible to employ fewer pressure sensors 9 than cylinders 1a. For example, a single pressure sensor 9 can be used for all the cylinders, or there can be ½ as many pressure sensors 9 as there are cylinders 1a, and the fuel injection amount and ignition timing of all or some of the cylinders 1a can be controlled based on the measured pressure or pressures. This arrangement results in somewhat of a decrease in control accuracy, but it has the advantage that equipment costs are reduced.

If feedback control based on the cylinder pressure is performed while the exhaust gas is being cleaned by an exhaust gas cleaning apparatus (i.e., under the exhaust gas cleaning control, fuel injection is controlled based on the air/fuel ratio sensor output so as to make the air/fuel ratio equal to the stoichiometric air/fuel ratio at which the cleaning effect of an exhaust gas cleaning catalyst is maximized), the accuracy of control decreases due to variations in the cylinder internal pressure. Therefore, at this time, feedback control can be halted.

From the above description, it can be seen that a control apparatus according to the present invention can perform feedback control of the fuel injection amount and the ignition timing of an engine using feedback coefficients which are a function of the cylinder pressure. Since the fuel injection and ignition are controlled by feedback, it is not necessary that the engine have characteristics which are identical to a baseline engine in order for control to be accurate. Thus, even when there are variations among engines due to manufacturing variations, each engine can be accurately controlled. Therefore, the manufacturing costs of the engine can be decreased, and the accuracy of engine control can be increased.

What is claimed is:

1. A control apparatus for an internal combustion engine comprising:
   a cylinder pressure sensor for measuring the internal pressure of a cylinder of the engine;
   air quantity calculating means for calculating the quantity of air in the cylinder based on the pressure measured by the cylinder pressure sensor;
   fuel injection/ignition timing means for calculating at least one of a fuel injection amount and an ignition timing for the engine based on the calculated air quantity;
   controlled variable calculating means for calculating a controlled variable based on the pressure measured by the cylinder pressure sensor; and
   correcting means for correcting at least one of the fuel injection amount and the ignition timing so as to decrease the difference between the controlled variable and a target value.

2. A control apparatus as claimed in claim 1 wherein the controlled variable calculating means comprises means for calculating an estimated air-fuel ratio for the engine.

3. A control apparatus as claimed in claim 2 wherein the estimated air-fuel ratio is calculated by the formula $$\text{estimated air-fuel ratio} = a_1 + a_2 C_R + a_S C_{BT}$$

wherein $C_R$ = the ratio of the pressures measured by the cylinder pressure sensor in the cylinder at two different crankshaft angles of the engine,
$C_{BT}$ = the difference between the ignition timing calculated by the fuel injection/ignition timing calculating means and the crankshaft angle at which the pressure measured by the pressure sensor is a maximum, and
$a_1$–$a_3$ are constants.

4. A control apparatus as claimed in claim 1 wherein the controlled variable calculating means comprises means for calculating the crankshaft angle of the engine at which the pressure measured by the pressure sensor in the cylinder is a maximum.

5. A control apparatus as claimed in claim 1 wherein the controlled variable calculating means comprises means for calculating the average effective pressure in the cylinder over a plurality of piston strokes.

6. A control apparatus for an internal combustion engine comprising:
   a cylinder pressure sensor for measuring the internal pressure of a cylinder of the engine;
   air quantity calculating means for calculating the quantity of air in the cylinder based on the pressure measured by the cylinder pressure sensor;
   fuel injection calculating means for calculating a fuel injection amount based on the calculated air quantity;
   ignition timing calculating means for calculating an ignition timing based on the calculated air quantity;
   means for controlling the fuel injection amount and the ignition timing of the engine based on the calculated fuel injection amount and ignition timing;
   means for calculating an estimated air-fuel ratio of the engine based on the pressure measured by the pressure sensor;
   means for correcting the fuel injection amount so as to decrease the difference between the estimated air-fuel ratio and a target value;
   means for determining the crankshaft angle of maximum pressure in the cylinder; and
   means for correcting the ignition timing so as to decrease the difference between the crankshaft angle of maximum pressure and a target value.

7. A control method for an internal combustion engine comprising:
   measuring the internal pressure of a cylinder of the engine;
   calculating the quantity of air in the cylinder based on the measured pressure;
   calculating a fuel injection amount based on the calculated air quantity;
   calculating an ignition timing based on the calculated air quantity;
   controlling the fuel injection amount and the ignition timing of the engine based on the calculated fuel injection amount and ignition timing;
   calculating an estimated air-fuel ratio of the engine based on the pressure in the cylinder;
   correcting the fuel injection amount so as to decrease the difference between the estimated air-fuel ratio and a target value;
   determining the crankshaft angle of maximum pressure in the cylinder; and
   correcing the ignition timing so as to decrease the difference between the crankshaft angle of maximum pressure and a target value.

* * * * *